Patented Dec. 12, 1950

2,533,208

UNITED STATES PATENT OFFICE 2,533,208

ELECTROLYTIC PRODUCTION OF GELATINOUS TITANIUM HYDRATE NUCLEI

Benjamin Wilson Allan and Frank O. Rummery, Baltimore, Md.

No Drawing. Application August 22, 1944, Serial No. 550,672

6 Claims. (Cl. 204—130)

This invention relates to the production of titanium oxide pigments and has special reference to novel purification of seed for use in the hydrolyses of hydrolyzable titanium salt dispersion, the hydrolysate of which yields rutile titanium dioxide pigment on calcination.

In the hydrolyses of titanium salt solutions, particularly titanium sulfate solutions, it is generally desirable that the seed nuclei prepared from dispersions containing monovalent anions be freed of such monovalent anions prior to their use as seed. Because of the corrosive action of such a solution on lead hydrolysis equipment it is important to remove the monobasic acid by some simple and economical means. For such removal of extraneous anions, laborious coagulation, filtration and washing has been resorted to heretofore.

Among the objects of this invention is the provision of a method of removing such monovalent anions from the titanium hydrate nuclei that is more efficient, cheaper and less laborious than the methods heretofore employed and does not impair the efficacy of the nuclei of seed.

A further object of this invention is the provision of an electrolytic process of removing monovalent anions from titanium hydrate nuclei prepared by a variety of methods and materials.

Other, further and more specific objects of this invention will become readily apparent to persons skilled in the art from a consideration of the following description.

We have found by electrolyzing dispersions of nuclear titanium hydrate, prepared by a wide variety of ways and from a wide variety of materials, that effective and efficient removal of undesirable, extraneous anions is accomplished in a cheaper and easier manner than by the processes formerly practiced. We have also found that the values of the nuclear titanium hydrate as seed in hydrolysis are not impaired.

Our invention is applicable to various types of cured seed, such as those prepared from peptized sols, solutions, dilute seeds, etc., whether or not stabilizers are present during curing, as will be seen from the following examples.

For this electrolysis, there are employed electrodes of platinum, metal-free graphite, or other suitable material which are immersed so that a direct current may be passed through the seed suspension with the monobasic acid acting as the electrolyte. The solution is agitated rapidly as electrolysis proceeds and any deposition of coagulated seed nuclei is removed from the electrodes by frequent scraping or brushing. The current, which may be supplied by a low voltage, high amperage, direct current generator, liberates hydrogen and chlorine at the cathode and anode respectively, as decomposition products of the HCl. The electrolytic method admits of collection at the electrodes of the hydrogen and chlorine gases, if desired.

Generally, no semi-permeable membrane is used to separate the electrodes. However, if it is desired to reduce a portion of the dispersed $TiO_2$ to the trivalent condition, a close-fitting membrane is placed around the anode, allowing sufficient space between it and the anode to contain a small amount of electrolyte, such as dilute HCl solution. When sufficient reduction has taken place the membrane may be removed and the electrolysis completed without a membrane.

EXAMPLE I

Seed from titanium tetrachloride

A solution of titanium tetrachloride containing 102 g./l. $TiO_2$ and 190 g./l. HCl was treated with 170 g./l. $Na_2CO_3$ to precipitate titanium ortho hydrate at 7.5 pH. The hydrate was filtered and washed substantially chloride free, and peptized with 0.6 g. HCl per 1.0 g. $TiO_2$. Bone glue stabilizer was added so that 2% bone glue was present on the basis of the $TiO_2$, and the dispersion diluted to 60 g./l. $TiO_2$. The temperature was raised to 85°–95° C. in 15 minutes, maintained in that range for 10 minutes to develop the desired nucleating properties and then cooled quickly to 30° C.

100 cm.$^3$ of the stable, opalescent, cured seed dispersion was electrolyzed with carbon electrodes having one square inch effective surfaces. The electrodes were immersed, one inch apart, in the seed dispersion, which was cooled by a water coil. The electrolysis was at constant temperature of 30° C., and continued until the sol had become gelatinized.

Table I shows the variations in voltage, amperes, concentration of HCl and concentration of $TiO_2$.

TABLE I

| Time, min. | Volts | Amps | HCl g./l. | $TiO_2$ g./l. |
|---|---|---|---|---|
| 0 | 12.0 | 8.0 | 36.0 | 60.2 |
| 30 | 12.5 | 6.0 | 27.0 | 60.5 |
| 60 | 13.0 | 4.0 | 19.0 | 61.0 |
| 90 | 16.0 | 3.0 | 12.5 | 61.4 |
| 120 | 18.0 | 2.2 | 8.0 | 61.8 |
| 150 | 19.0 | 2.05 | 5.8 | 62.2 |
| 180 | 19.0 | 2.00 | 4.7 | 62.5 |

The final mol ratio of HCl/TiO₂ was found to be 0.17.

The small residual amount of HCl adsorbed to the TiO₂ seed nuclei, as in the gel product of the electrolysis, was found to have very little corrosive action on lead.

EXAMPLE II

Seed from titanyl sulfate

A solution of titanyl sulfate containing 75 g./l. TiO₂ and 177 g./l. H₂SO₄ was treated with 170 g./l. Na₂CO₃ to precipitate titanium ortho hydrate at 7.5 pH. The hydrate was filtered and washed substantially sulfate free, peptized with 0.6 g. HCl per 1.0 g. TiO₂, treated with 2% citric acid as stabilizer on the basis of the TiO₂, and diluted to 60 g./l. TiO₂. The dispersion was found to contain sulfate equivalent to 0.21% H₂SO₄ on the basis of TiO₂. The seed was cured and electrolyzed as in Example I, to low HCl/TiO₂ ratio.

EXAMPLE III

Dilute seed from titanium tetrachloride without any stabilizer

Titanium tetrachloride was diluted to 10 g./l. TiO₂, heated in 15 minutes to 85°-95° C., and cured in that range of temperature for 10 minutes to develop the desired nucleating properties, then cooled quickly to 30° C. and electrolyzed to low ratio HCl/TiO₂ as in Example I.

EXAMPLE IV

Seed from plant liquor containing 60 g./l. TiO₂ and 9.2 g./l. Fe

The following ordinary plant hydrolysis liquor, made from ilmenite ore, was carefully clarified and used to make a seed containing iron:

Total TiO₂ = 260 g./l.
Reduced TiO₂ = 9.1 g./l.
Fe = 41 g./l.
Total H₂SO₄ = 625 g./l.
Active H₂SO₄ = 553 g./l.
Acid Factor = 1.74

Active H₂SO₄ is the sum of the free acid and acid combined with TiO₂, all calculated as H₂SO₄.

Acid factor is the molar ratio of the active H₂SO₄ to the total TiO₂.

Reduced TiO₂ is the sulfate of titanium wherein the titanium is in the trivalent condition.

The solution was treated with 170 g./l. Na₂CO₃ to precipitate titanium ortho hydrate at 7.5 pH. The hydrate was filtered, washed until the filtrate showed no precipitate with barium chloride, and peptized with 0.6 g. HCl per 1.0 g. TiO₂. The dispersion was found to contain 9.2 g./l. Fe. Sufficient hydrochloric acid was added to just form ferrous chloride with the iron. The dispersion was reduced electrolytically using graphite electrodes, with the anode separated from the seed dispersion by a porous membrane containing dilute HCl, until approximately 1 g./l. TiO₂ was present as titanous chloride. Bone glue was added to the extent of 0.5% on the bases of the TiO₂, and the sol was diluted to 60 g./l. TiO₂. The temperature was raised in 15 minutes to 85°-95° C. and maintained in that range of temperature for 10 minutes in order to develop the desired nucleating properties, and then cooled quickly to 30° C.

One liter of the seed dispersion was electrolyzed with graphite electrodes, each having 20 square inches effective surface. The electrodes were immersed, one inch apart, in the seed dispersion, which was cooled by a water coil. The temperature was maintained at 30° C., and electrolysis was continued to complete gelation of the sol.

Table II shows the progress of the electrolysis.

TABLE II

| Time, min. | Amps. | HCl, g./l. | TiO₂, g./l. |
|---|---|---|---|
| 0 | 29.5 | 35.8 | 60.0 |
| 30 | 26.5 | 29.8 | 60.2 |
| 60 | 24.0 | 24.2 | 60.5 |
| 90 | 22.0 | 18.9 | 60.9 |
| 120 | 20.2 | 14.0 | 61.4 |
| 150 | 18.6 | 9.3 | 61.9 |
| 180 | 17.2 | 4.8 | 62.4 |

The final mol ratio of HCl/TiO₂ was found to be 0.17.

EXAMPLE V

Seed by metathesis

A solution of titanyl sulfate containing 270 g./l. TiO₂ and 507 g./l. H₂SO₄ was treated with a thick water slurry of CaCO₃ sufficient to reduce the soluble sulfate content to 0.81 g. H₂SO₄ per 1.0 g. TiO₂ (equivalent to 0.6 g. HCl per 1.0 g. TiO₂). The insoluble CaSO₄ was removed by filtration. Barium chloride solution, the chemical equivalent of the remaining sulfate, was added to the filtrate. The resulting BaSO₄ precipitate was removed by filtration.

The clear filtrate was treated with dilute bone glue equivalent to 2% glue on the basis of TiO₂. The concentration was adjusted to 60 g./l. TiO₂, the seed cured 10 minutes at 85°-95° C., cooled to 30° C., and electrolyzed to low HCl/TiO₂ ratio by means of platinum electrodes.

Table III shows the progress of the electrolysis.

TABLE III

| Time, min. | Amps. | HCl, g./l. | TiO₂, g./l. |
|---|---|---|---|
| 0 | 5 | 36.1 | 60.0 |
| 30 | 5 | 28.0 | 60.4 |
| 60 | 5 | 20.4 | 61.0 |
| 90 | 5 | 14.2 | 61.5 |
| 120 | 5 | 6.9 | 62.2 |

The final mol ratio of HCl/TiO₂ was found to be 0.24.

When the above electrolyzed nucleating solutions were used to hydrolyze titanium sulfate solutions, metatitanic acid was obtained which converted to rutile titanium dioxide upon calcination above 800° C.

Our invention possesses the following advantages:

1. By dispensing with filtration and washing and employing a closed system, considerable labor saving is accomplished.

2. The simple cell equipment is less elaborate than the equipment of prior processes, such as those employing filtration and washing, thus effecting a lower cost of installation.

3. While other methods have been found to entail TiO₂ losses up to 20% of the initial weight TiO₂ treated, in our process there is practically no TiO₂ loss.

4. The use of high-grade electrodes, such as graphite, platinum, etc. avoids contamination of the product. In the methods heretofore employed, the addition of various reagents as well as the salts of the wash water served to introduce undesirable foreign matter. Such impurities have been found harmful especially when dealing with colloidal systems such as those containing nucleating sols.

5. When operating with seeds from plant liquor containing iron, which must be reduced by some means prior to curing of the seed in order to prevent the formation of colloidal ferric oxide, such reduction is accomplished during the electrolysis by merely employing a semi-permeable membrane as heretofore described. In prior processes, the reduction of the iron is accomplished by adding a metal to effect chemical reduction of the titanic sulfate to titanous sulfate and to reduce the iron, thus introducing extraneous ions.

In the preparation of the above stable seed dispersions, ratios of 0.4 to 0.9 g. HCl per 1.0 g. $TiO_2$ are usable, the ratio of 0.6 g. HCl per 1.0 g. $TiO_2$ being preferred.

The expression "cure" and its derivatives are used to denote the conversion by heating of orthotitanic acid sols prepared with monobasic acid, which sols are soluble in dilute acids, as well as other compounds of titanium and monobasic acid, which compounds are soluble in dilute acids, into sols of metatitanic acid which are insoluble in dilute acids.

The term "stabilizer" and its derivatives are used to denote the prevention of secondary agglomeration of the cured seed after the primary growth thereof has been arrested by cooling, with consequent impartation to the dispersed titanium hydrate seed of the property of maintaining practically its entire activity, potency and efficiency as a seed for prolonged period of time after stabilization, as distinguished from the relatively short period of effectiveness of the dispersed titanium hydrate seed before stabilization. It is the specific phenomenon of preventing the submicroscopic crystal seeds from growing together into microscopic and macroscopic crystal seeds.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. In a process of making a seed for the hydrolysis of hydrolyzable titanium salt dispersions, forming titanium hydrate nuclei by heating and curing a dispersion of a member of the class consisting of the hydrochloric acid salts of titanium and the orthohydrate of titanium peptized with HCl, cooling and then removing HCl from the nuclei and effecting gelatinization of said nuclei by electrolyzing a dispersion of the nuclei in aqueous HCl whereby hydrogen gas is evolved at the cathode and chlorine gas is evolved at the anode, the electrolysis being conducted with anode insoluble in the electrolyte.

2. In a process of making a stabilized seed for the hydrolysis of hydrolyzable titanium salt dispersions, forming stabilized titanium hydrate nuclei by heating and curing a dispersion of a member of the class consisting of the hydrochloric acid salts of titanium and the orthohydrate of titanium peptized with HCl, a stabilizer having been added to said dispersion before curing, cooling and then removing HCl from the nuclei and effecting gelatinization of said nuclei by electrolyzing a dispersion of the nuclei in aqueous HCl whereby hydrogen gas is evolved at the cathode and chlorine gas is evolved at the anode, the electrolysis being conducted with anode insoluble in the electrolyte.

3. In a process of making a seed for the hydrolysis of hydrolyzable titanium salt dispersions, forming titanium hydrate nuclei by heating and curing a dispersion of a hydrochloric acid salt of titanium, cooling and then removing HCl from the nuclei and effecting gelatinization of said nuclei by electrolyzing a dispersion of the nuclei in aqueous HCl whereby hydrogen gas is evolved at the cathode and chlorine gas is evolved at the anode, the electrolysis being conducted with anode insoluble in the electrolyte.

4. In a process of making a seed for the hydrolysis of hydrolyzable titanium salt dispersions, forming titanium hydrate nuclei by heating and curing a dispersion of orthohydrate of titanium peptized with HCl, cooling and then removing HCl from the nuclei and effecting gelatinization of said nuclei by electrolyzing a dispersion of the nuclei in aqueous HCl whereby hydrogen gas is evolved at the cathode and chlorine gas is evolved at the anode, the electrolysis being conducted with anode insoluble in the electrolyte.

5. The process claimed in claim 1, wherein the electrolysis is effected in a two-compartment cell.

6. The process claimed in claim 1, wherein the electrolysis is effected in a two-compartment cell while the electrolyte is agitated.

BENJAMIN WILSON ALLAN.
FRANK O. RUMMERY.

REFERENCES CITED

The following references are of record in the file of this patent:

UNITED STATES PATENTS

| Number | Name | Date |
|---|---|---|
| 923,745 | Whitney | June 1, 1909 |
| 1,132,394 | Schwerin | Mar. 16, 1915 |
| 1,216,371 | Schwerin | Feb. 20, 1917 |
| 1,235,638 | Barton | Aug. 7, 1917 |
| 1,326,105 | Schwerin | Dec. 23, 1919 |
| 1,746,542 | Low | Feb. 11, 1930 |
| 1,766,592 | Blumenfeld | June 24, 1930 |
| 1,878,235 | Gortner et al. | Sept. 20, 1932 |
| 2,017,049 | Jones | Oct. 15, 1935 |
| 2,073,621 | Blaney | Mar. 16, 1937 |
| 2,285,485 | Barksdale et al. | June 9, 1942 |
| 2,342,483 | Olson | Feb. 22, 1944 |

FOREIGN PATENTS

| Number | Country | Date |
|---|---|---|
| 533,227 | Great Britain | Feb. 10, 1941 |

OTHER REFERENCES

Komagata: Transactions of Electrochemical Society, vol. 73 (1938), pp. 511-522.